United States Patent Office 3,743,489
Patented July 3, 1973

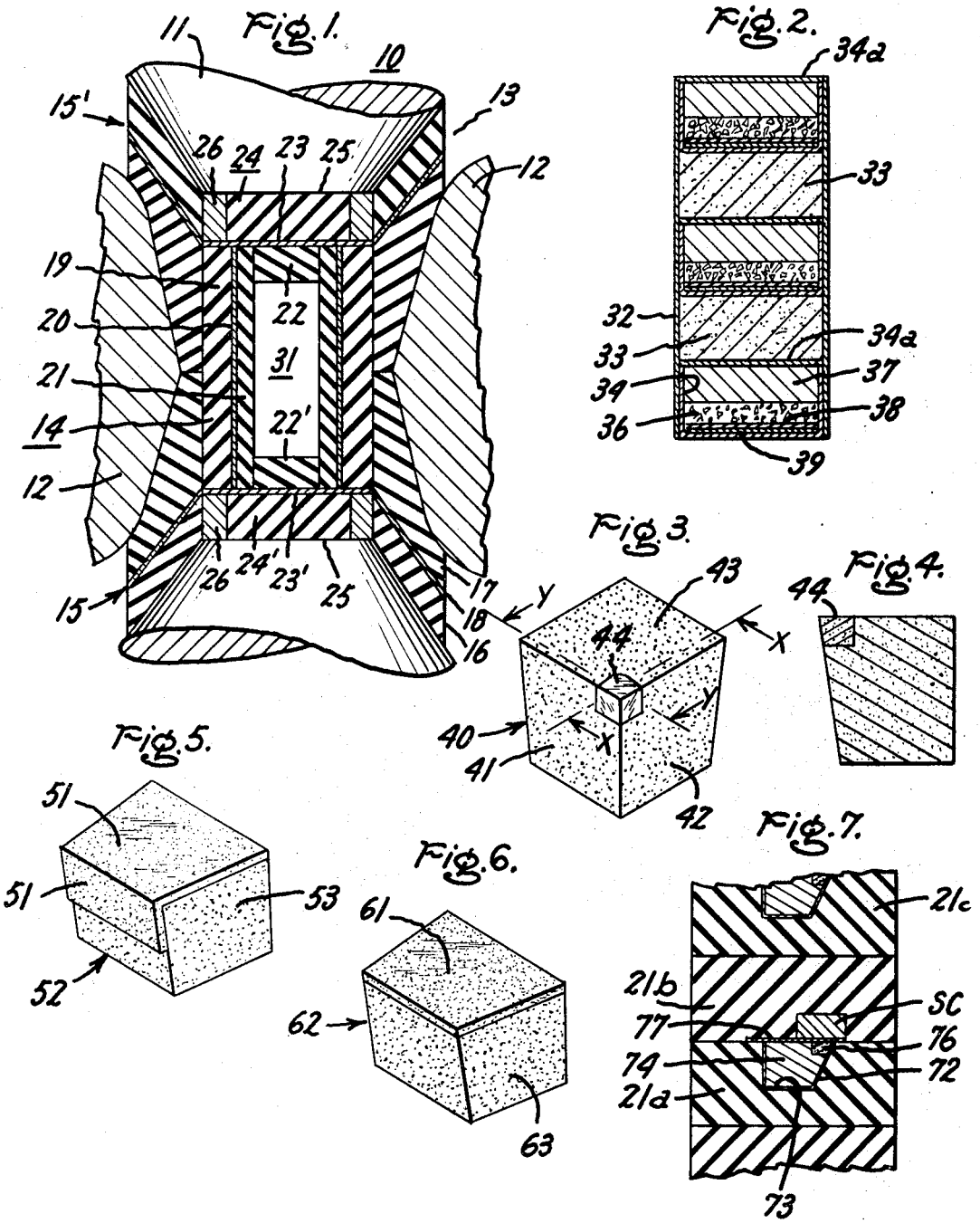

3,743,489
ABRASIVE BODIES OF FINELY-DIVIDED CUBIC BORON NITRIDE CRYSTALS
Robert H. Wentorf, Jr., Schenectady, and William A. Rocco, Scotia, N.Y., assignors to General Electric Company
Filed July 1, 1971, Ser. No. 158,711
Int. Cl. B24d 3/02; C09c 1/68
U.S. Cl. 51—307
17 Claims

ABSTRACT OF THE DISCLOSURE

Aluminum alloys of nickel, cobalt, manganese, iron, vanadium and chromium have been found to provide successful bonding mechanisms for the preparation of cubic boron nitride (CBN) compacts. These bonding media are particularly effective for preparing compacts of CBN crystals smaller than about 30 micrometers in largest dimension. The preparation of tool inserts made of cubic boron nitride crystals bonded to and supported on a sintered carbide mass is described wherein such an aluminum alloy is used as the bonding medium.

BACKGROUND OF THE INVENTION

The preparation of cubic boron nitride (CBN) is disclosed and claimed in U.S. Pat. 2,947,617—Wentorf. The bonding together of CBN crystals to form a compact abrasive body is disclosed in each of U.S. Pat. No. 3,136,615—Bovenkerk et al. and U.S. Pat. No. 3,233,988—Wentorf et al. Each of the aforementioned patents is incorporated by reference.

Methods for the production of ever more dense, tougher compacts of CBN are constantly being sought in order to improve man's capabilities for machining nickel-base superalloys at higher speeds, e.g. at greater than 50 surface feet/minute.

SUMMARY OF THE INVENTION

Superpressure processes are described herein for the preparation of cubic boron nitride compacts by employing aluminum alloys of nickel, cobalt, manganese, iron, vanadium and chromium as bonding media. Tools have been produced wherein a CBN compact is bonded to a sintered carbide support block during preparation of the compact.

A unique capability of these alloys as bonding media is manifest in the preparation of compact from CBN crystals of very fine particle size (e.g. less than 30 micrometers). Other bonding media have been ineffective in this size range for producing useful tool bodies showing significantly less wear than Carboloy® sintered carbide in the machining of superalloys (e.g. René 41).

BRIEF DESCRIPTION OF THE DRAWING

This invention will be better understood from the following description and drawing in which:

FIG. 1 illustrates one exemplary high pressure, high temperature apparatus useful in the practice of this invention;

FIG. 2 illustrates in section one form of a charge assembly configuration for use within the apparatus of FIG. 1 in the practice of the instant invention, FIG. 3 is a three-dimensional view illustrating a composite CBN machine tool insert;

FIG. 4 is a section taken through the insert of FIG. 3 either along line XX or along line YY;

FIGS. 5 and 6 are each three-dimensional views of composite CBN/sintered carbide machine tool inserts prepared according to this invention and FIG. 7 is a sectional view showing a combined liner/charge assembly for preparing the structure of FIGS. 3, 5 and 6.

DESCRIPTION OF THE PREFERRED EMBODIMENT

One preferred form of a high pressure, high temperature apparatus in which the composite tool insert of the instant invention may be prepared is the subject of U.S. Pat. 2,941,248—Hall (incorporated by reference) and is briefly illustrated in FIG. 1. Reaction vesesl arrangements useful in the practice of this invention are described in U.S. patent application S.N. 144—Wentorf, Jr., filed Jan. 2, 1970, now U.S. 3,609,818. The Wentorf ('818) patent is incorporated by reference.

Apparatus 10 includes a pair of cemented tungsten carbide punches 11 and 11' and an intermeditae belt or die member 12 of the same material. Die member 12 includes an aperture 13 in which there is positioned a reaction vessel 14. Between punch 11 and die 12 and between punch 11' and die 12 there are included gasket/insulating assemblies 15, 15', each comprising a pair of thermally insulating and electrically non-conducting pyrophyllite members 16 and 17 and an intermediate metallic gasket 18.

Reaction vessel 14 in one preferred form, includes a hollow salt cylinder 19. Cylinder 19 may be of other material, such as talc, which (a) is not converted during high pressure-high temperature operation to a stronger, stiffer state (as by phase transformation and/or compaction) and (b) is substantially free of volume discontinuities occurring under the application of high temperatures and pressures, as occurs, for example, with pyrophyllites and porous alumina. Materials meeting the criteria set forth in U.S. 3,030,662—Strong (column 1, lines 59 through column 2, line 2, incorporated by reference) are useful for preparing cylinder 19.

Positioned concentrically within and adjacent cylinder 19 is a graphite electrical resistance heater tube 20. Within graphite heater tube 20 there is in turn concentrically positioned the cylindrical salt liner 21. The ends of liner 21 are fitted with salt plugs 22, 22', disposed at the top and bottom, respectively. As will be described hereinbelow liner 21 may have a cylindrical hollow core to receive one large charge assembly containing sub-assemblies or the liner may consist of a series of mold assemblies arranged in a stack for the preparation of a plurality of composite tool inserts, e.g. as shown in FIGS. 3, 5, and 6.

Electrically conductive metal and end discs 23 and 23' are utilized at each end of cylinder 19 to provide electrical connection to graphite heater tube 20. Adjacent each disc 23, 23' is an end cap assembly 24 and 24' each of which comprises a pyrophyllite plug or disc 25 surrounded by an electrically conducting ring 26.

Operational techniques for simultaneously applying both high pressures and high temperatures in this apparatus are well known to those skilled in the superpressure art. The foregoing description relates to merely one high pressure, high temperature apparatus. Various other apparatuses are capable of providing the required pressures and temperatures that may be employed within the scope of this invention.

FIG. 2 illustrates an arrangement for producing a plurality of disc- or pill-shaped composites (sintered carbide substrate with a layer of sintered CBN formed thereover). Charge assembly 30, although not illustrated to the same scale, fits within space 31 of the apparatus of FIG. 1.

Charge assembly 30 consists of cylindrical sleeve 32 of shield metal selected from the group consisting of zirconium, titanium, tantalum, tungsten and molybdenum. Within cylindrical shield metal sleeve 32 are disposed a number of sub-assemblies separated by plugs 33 of the same material as cylinder 19, e.g. hexagonal boron nitride or NaCl, which remains substantially unchanged during the conduct of the process and facilitates separation of the subassemblies afterwards. Each sub-assembly is enclosed in a cup-shaped member 34 with cap disc 34a made of any of the materials useful for sleeve 32, but preferably made of zirconium or titanium. In each sub-assembly a mass 36 of finely-divided (less than about 30 micrometers) CBN crystals are disposed between a mass 37 and a pair of metal discs, disc 38 of aluminum and disc 39 of an alloying metal selected from the group consisting of nickel, cobalt, manganese, iron, vanadium and chromium. The relative positions of discs 38 and 39 is not critical so long as generation of the aluminum alloy occurs. The mass 37 may be of sintered carbide or may be made of sinterable carbide powder with sintering thereof occurring during the consolidation of the CBN. The amount of aluminum used relative to the amount of alloying metal is not critical and may range from about equal parts by weight to about 1 part of aluminum to 10 parts of alloying metal.

In the preparation of tool inserts by the instant process the charge assembly 30 is placed in the apparatus 10, pressure is applied thereto and the system is then heated. The temperatures employed are in the range from about 1300–1600° C. for periods of time in excess of about 3 minutes while at the same time the system is subjected to very high pressure e.g. of the order of 55 kilobars to insure thermodynamically stable conditions for the CBN content of the system. At 1300° C. the minimum pressure should be about 40 kilobars and at 1600° C. the minimum pressure should be about 50 kilobars. At the temperatures employed the sintering agent in mass 37 is melted making cobalt, nickel or iron (depending on the particular carbide formula) available for displacement from mass 37 into mass 36, where it alloys with the molten aluminum alloy, which is formed from discs 38 and 39 and by reaction in the CBN. The metallic medium so formed functions as an effective bonding agent for the CBN crystals near the interface between mass 36 and 37 for bonding these crystals between mass 36 and 37 for bonding these crystals to each to each other and to the sintered carbide. The rest of the crystals in the mass of CBN are bonded together by the metallic medium formed by alloying of the discs 38, 39 and by reaction of this alloy with CBN.

The amount of aluminum in the starting material may range from about 1 to about 40% by weight of CBN while the range of the alloying metal (nickel, cobalt, manganese, iron, vanadium and chromium) may range from about 2 to about 100% by weight of CBN. The amount of these alloying metals remaining in the consolidated CBN as matrix material will vary depending upon the pressure and length of application of high pressure/high temperature conditions. In any event the quantity of aluminum plus alloying metal atoms in the compacted CBN will be in excess of about 1% by weight of the CBN.

Pre-formed aluminum alloys may, of course, be used in place of separate discs for alloying in situ.

After completion of the high temperature, high pressure process, first the temperature and then the pressure are reduced. Upon recovery of the tool insert masses the protective sheath metal remains strongly affixed to the outer surfaces thereof. Exposure of the desired surfaces of the composite tool insert is accomplished by simply grinding away the protective sheath.

Composites prepared in accordance with this invention have at times been accidentally broken during decompression of the reaction vessel to recover the product. This type of breakage occurs in a direction generally perpendicular to the vertical axis of the charge assembly. In the case of the composites produced with the sub-assemblies of FIG. 2 the interface between the CBN and the sintered carbide lies in this same direction. The high quality of the bond at this interface is shown by the fact that most usually the breakage occurred through the CBN layer. Only rarely did breakage occur at the interface and in these instances the breakage surface was irregular, passing through the CBN and through the sintered carbide as well as along the interface. Thus, the interface is in general stronger than the tensile strength of the CBN crystals.

Microscopic (300×) examination of the polished edges of composites shaped into tool inserts has shown the reasons for this unusually strong interface bond. In "good bonding" the CBN grains at the interface appear (at 300× magnification) either to be in direct contact with the sintered carbide or to have a thin reaction layer disposed between the CBN grains and the sintered carbide. Any reaction layer is less than 10 micrometers thick indicating that in any case minimal disruption of, and attack on, the sintered carbide structure occurs. The interface is free of voids and is irregular on the scale of micrometers (1–100μ) due to pushing of the CBN into the sintered carbide and/or because of the movement of plastically deformed sintered carbide into interstices between adjacent CBN crystals. This type and quality of interlocked interface is clearly unattainable by soldering of a pre-formed CBN compact to a sintered carbide disc.

Although the problem of bonding together CBN grains of sizes in excess of 80 micrometers (in largest dimension) has been adequately solved [as is described in U.S. patent application S.N. 158,709, Wentorf, Jr., et al., filed July 1, 1971 and assigned to the assignee of the instant application], the techniques set forth therein are ineffective for producing satisfactory bonding together of CBN crystals measuring 30 micrometers (in largest dimension) and smaller, presumably because of the large impurity content remaining concentrated on the extensive surface area of such small particles in spite of various attempts at removing these impurities. The instant invention, however, has successfully produced numerous CBN/sintered carbide composites employing CBN crystals in the size range of 1–10 micrometers. These composites display significantly superior wear properties as compared to sintered carbide bodies. CBN compacts (not attached to sintered carbide backing) have also been produced from CBN crystals in this size range utilizing sub-assemblies in which mass 37 is absent.

In many of the examples set forth hereinbelow a slight excess of aluminum alloy is formed and is left over after infiltration between the CBN crystals has been completed. This slight excess may alloy with cup 34 or with part of the sintered carbide mass 37.

After the temperature and pressure are reduced, the composites are removed and may, thereafter, be ground into shape for use as cutting tools.

When a polished surface of such a body is examined under the microscope, many fine particles of CBN are seen fitting closely together with the minute interstices therebetween filled with a second phase, which is apparently metallic. Thus, scratches were observed on the polished surface in contrast to strings of holes from CBN fragment pull-out as had been observed on polished surfaces of compacts prepared using various other active metals as the bonding medium.

Penetration between and bonding of the CBN crystals by the bonding medium is excellent in composites and CBN compact prepared according to this invention. Characteristic X-ray diffraction patterns occur for any given alloying system (aluminum plus one of the specified alloying metals). These diffraction patterns have established the presence of CBN, AlN and additional unidentifiable phases. Electron beam micro-probe tests of composites and CBN compacts made with aluminum and nickel as the source of the bonding medium show both Al and Ni in the interstices.

The finely-divided CBN crystals are preferably prepared by jet-milling of larger CBN grains. Prior to the introduction thereof into the reaction vessel the CBN fines are preferably heated (900° C., 1 hour) in ammonia to further clean the surfaces of the crystals.

Some CBN/sintered carbide composites prepared in the practice of this invention have been shaped into tools (square face, about 0.24" on an edge) and used ot cut Inconel 718, a nickel-base superalloy. A typical Ni-Al bonded tool would have had a face layer of bonded CBN ranging from 0.030" to 0.010" thick firmly bonded to a sintered carbide support block (e.g. grade 883 Carboloy sintered carbide) about 0.120" thick. The wear on such tools was generally significantly less than was encountered using grade 883 Carboloy tools under the same conditions.

A number of composites prepared according to this invention were subjected to wear tests in which a 0.125" diameter rod of René 41 (a nickel-base superalloy) rotating at 2000 r.p.m. was pressed against the CBN layer of the composite being tested with a force of 80 lbs. for 3 minutes. The depth of the wear scar on the compact was then measured. In each of the following examples the arrangement employed was substantially the same as for one sub-assembly shown in FIG. 2. The protective cup (or sleeve) used in each case was 0.250" in diameter. Unless otherwise stated in the examples all CBN used was jet-milled (1–10 micrometer grains in largest dimension). The CBN used in Examples II and VI had been fired in $NH_3$ before loading. In each example a pre-sintered carbide disc (883 grade Carboloy sintered carbide) was used for the support block in the composite.

EXAMPLE I

A Zr cup was filled with a pre-sintered carbide disc (.050" thick), CBN grains (0.050 g.), Al disc (0.010 g.) and Co disc (0.030 g.). The assembly was simultaneously subjected to a pressure of 54 kb. and a temperature of 1550° C. for 61 minutes. The bonding of CBN to carbide and the bonding of the CBN grains with the metallic matrix were good. The consolidated CBN portion took a good polish. Wear test scar . . . 1400 micro-inch deep.

EXAMPLE II

A Mo sleeve (.002" thick) with Mo end discs (.002" thick) was loaded with a pre-sintered carbide disc (.050" thick), CBN grains (.065 g.), Al disc (.010 g.) and a layer of mixed Co (.015 g.) and Al (.004 g.) powders. The assembly was simultaneously subjected to a pressure of 56 kb. and a temperature of 1500° C. for 63 minutes. Good bonding of CBN to the sintered carbide and to the metal matrix was observed. The CBN in the metallic matrix showed as a densely packed microstructure. Wear test scar . . . 1000 micro-inch deep.

EXAMPLE III

A Zr cup was loaded with a pre-sintered carbide plug (.050" thick), CBN grains (.060 g.) and a mixture of coarse powders (Al 0.010 g. and Mn 0.040 g.). The assembly was simultaneously subjected to a pressure of 55 kb. and a temperature of 1550° C. for 60 minutes. Bonding of the CBN to carbide and to the metallic matric was good. The CBN compact portion of the composite took a good polish. Wear test scar . . . 500 micro-inch deep.

EXAMPLE IV

A Mo cup was loaded with a pre-sintered carbide plug (.050" thick), CBN fines (.060 g.), an Al disc (.005 g.) and a mixture of V (.010 g.) and Al (.010 g.) powders. Observations of composite and CBN compact portion were as for the product in Example III. Wear test scar . . . 1500 micro-inch deep.

EXAMPLE V

A Zr cup (.002" thick) was loaded with a sintered carbide disc (.121" thick), a 90 Fe 10 Al disc (.008" thick x .247" in diameter, .025 g.) and CBN grains (100/120 mesh, 0.093 g.). The metal alloy disc was disposed at the surface of the sintered carbide in contact with both the sintered carbide and the CBN. This assembly was simultaneously subjected to 55 kb. of pressure and a temperature of 1500° C. for 60 minutes. The composite so produced was examined and it was found that considerable direct bonding between CBN grains and between CBN grains and the sintered carbide had occurred.

EXAMPLE VI

A Mo cup was loaded with a sintered carbide disc (.050" thick), CBN (.080 g. 1–20$\mu$), and Al disc (.015 g.) and chips of Inconel 718 (.035 g.). Inconel 718 has as a composition (by weight): 52.5% Ni, 0.2% Mn, 18% Fe, 5.2% Cb, 0.6% Al, 19% Cr, 3% Mo, 0.8% Ti. The assembly was simultaneously subjected to a pressure of 54 kb. and a temperature of 1500° C. for 60 minutes. A good bond had developed between the CBN and the carbide. The CBN mass was very dense and contained very little matrix metal. Such metal matrix as was present was well-bonded to the CBN grains. Wear test scar . . . 700 micro-inch deep.

EXAMPLE VII

A Zr cup was loaded with a pre-sintered disc (.050" thick) and a mixture ).065 g.) of CBN grains plus grade 55A Carboloy (13% Co, 87% WC) carbide powder (.032 g.) and Al powder (.003 g.). The assembly was simultaneously subjected to 55 kb. of pressure and a temperature of 1500° C. for 30 minutes. Some sintering together of CBN grains occurred and good bonding was observed between the CBN grains and both the pre-sintered disc and the metallic matrix. Wear test scar . . . 350 micro-inch deep.

EXAMPLE VIII

A Zr cup was loaded with a pre-sintered carbide disc (.050" thick), a layer of grade 190 Carboloy carbide powder (.046 g.; 25% Co, 75% WC), an Al disc (.010 g.) and CBN grains (0.060 g.). The layer of carbide powder was disposed over the surface of the pre-sintered disc and the Al disc was placed between the carbide powder layer and the CBN. The assembly was simultaneously subjected to a pressure of 57 kb. and a temperature of 1550° C. for 60 minutes. Good bonding occurred between the pre-sintered carbide and the carbide sintered in situ. Also good bonding was observed between the CBN and the metallic matrix. A few larger (20–30 micrometer) metallic islands were observed. The consolidated CBN portion polished well. Wear test scar . . . 450 micro-inch deep.

EXAMPLE IX

Two composites were prepared for forming into lathe cutting tools. In each case the arrangement shown for one sub-assembly in FIG. 2 was employed. A 0.350" diameter Zr cup 34 and cover 34a were employed. A sintered carbide (883 grade Carboloy carbide) disc 0.115" thick was employed for mass 37 and 0.120 g. of cleaned jet milled CBN (1–10 micrometers) was used for mass 36. Al disc 38 weighed 0.020 g. and Ni disc 39 weighed 0.066 g. This assembly was simultaneously subjected to a pressure of 55 kb. and a temperature of 1500° C. for 60 minutes. The composites were recovered, shaped to final dimensions (0.125" thick x 0.24" square) and tested.

In a comparison with a grade 883 Carboloy tool, the two lathe cutting tools of Example IX were used to cut Inconel 718. Under conditions which produced about 0.012" of wear on a grade 883 Carboloy tool, the CBN composites showed only 0.004" of wear on the compact face that had rubbed against the workpiece. The chip-curling (CBN) face of the composite was not badly worn either, except for a gouge where the outside corner of the chip rode. This same type of wear also occurred on all tools tested (including the Carboloy tools). The recurrence of this particular type of wear in all tools was predictable, because all tools had been made in the same geometry. The CBN composites performed better than the Carboloy tool as the cutting speed was increased.

The preferred direct bonding relationship is that created in situ between the very high strength CBN material and the significantly larger mass of underlying stiff carbide support material. This direct bonding obviates any need for the interposition of any bonding layer between compact and substrate, as for example would result from brazing or soldering. By providing stiff, non-yielding support material in direct contact with the CBN-rich machining edge region, the incidence of fracture in the CBN material is greatly minimized, and not so much CBN is required to make a tool.

The sintered carbide backing itself may be prepared in situ simply by using sinterable carbide powder for mass 37. Preferably the material used is tungsten carbide molding powder (mixture of carbide powder and cobalt powder) commercially available in grit sizes of from 1 to 5 microns. The tungsten carbide may, if desired, be replaced in whole or in part by either or both of titanium carbide and tantalum carbide. Since some use of nickel and iron has been made in the bonding of carbides, the material for providing the metal bond in the cemented carbide may be selected from the group consisting of cobalt, nickel, iron and mixtures thereof. Cobalt, however, is preferred as the metal bond material. The composition of carbide molding powders useful in the practice of this invention may consist of mixtures containing about 75–97% by weight carbide and about 3–25% by weight cobalt.

Referring now to the composite tool inserts shown in FIGS. 3, 5, 6, in the preparation of these non-cylindrical shapes in which a sintered carbide support and CBN fines are unified in the presence of particular combinations of materials, a modified construction of salt liner 21 and plugs 22, 22' is required. Thus, the structure fitting within heater tube 20 may be formed as a series of cylindrical blocks in stacked cooperating arrangement to provide molds to be filled with the reaction constituents. By way of example, in FIG. 7 salt block 21a has formed therein a recess 72 replicating the shape of the desired tool insert allowing for the thickness of the protective metal sheath 73. Recess 72 is lined with protective metal 73 (e.g. zirconium) as shown to contain a pre-formed sintered carbide body (or mass of sinterable carbide powder) 74, mass of finely-divided CBN crystals 76 and discs (of powders) of aluminum and the metal to be alloyed therewith. Cover salt block 21b has recesses therein to accommodate cover sheet 77 completing the protective metal enclosure and, preferably, a back-up block of sintered carbide SC to minimize puncturing of the protective metal layer 77. A number of such cooperating pairs of salt block such as 21a, 21b may be employed with the contents described.

In the tool insert construction 40 of FIG. 3 both faces 41 and 42 of the cemented carbide 43 and CBN composite 44 are formed with a rake (FIG. 4) to facilitate presentation of the CBN cutting edges of CBN composite 44 to the workpiece.

In forming the thin layers 51, 61 of consolidated CBN (about 90–97 volume percent) in the tool insert constructions 52, 62 shown in FIGS. 5 and 6, the layer of CBN fines is limited to a maximum thickness of about .060 inch (1.5 mm.) and a minimum thickness of about .001 inch (.025 mm.) although the capability exists for preparing such layers in thicknesses as great as about .080 inch. The purpose of deliberately making these layers 51, 61 very thin is in order (a) to present the CBN layers 51, 61 as chip breaker faces, (b) to make it easier to sharpen the tool inserts 52, 62 and (c) to economize on the CBN used. Ideally, the relationship between the properties of the CBN layer of the cemented carbide will be such that the edge of the CBN will wear away slightly less rapidly than the cemented carbide. When this condition prevails, a small amount of the CBN layer will continue to project beyond the cemented carbide body to provide a cutting edge and the amount of CBN utilized will be commensurate with the life of the tool.

It is to be understood that composites produced as products in the practice of this invention will, most usually, be bonded to a larger body, e.g. a tool shank or drill bit for presentation to the material to be cut.

What we claim as new and desire to secure by Letters Patent of the United States is:

1. In a tool insert wherein a unified mass of greater than 70 percent by volume of cubic boron nitride crystals is bonded to a larger metallic mass for support thereof, the combination with said mass of cubic boron nitride crystals of:
    (a) a mass of sintered carbide strongly bonded thereto, the carbide portion of said mass of sintered carbide being predominantely of a material selected from the group consisting of tungsten carbide, titanium carbide, tantalum carbide and mixtures thereof,
    (b) the interface between said mass of cubic boron nitride crystals and said sintered carbide being free of voids and being irregular and interlocking on the scale of about 1–100 micrometers, said interlocking occurring between individual cubic boron nitride crystals and portions of the sintered carbide mass and
    (c) said mass of cubic boron nitride crystals including a metallic phase containing aluminum atoms and atoms of at least one alloying element selected from the group consisting of nickel, cobalt, manganese, iron, vanadium and chromium, the total of said atoms of aluminum and alloying element being in excess of 1% by weight of the cubic boron nitride present.

2. The combination of claim 1 wherein the size of the individual cubic boron nitride crystals is less than about 30 micrometers in largest dimension.

3. The combination of claim 1 wherein the size of the individual cubic boron nitride crystals is less than about 10 micrometers in largest dimension.

4. The combination of claim 1 wherein the mass of cubic boron nitride crystals is present as a layer having a thickness of about 0.060 inch or less.

5. The combination of claim 4 wherein the concentration of cubic boron nitride crystals in the layer is in excess of about 90 percent by volume.

6. The process for preparing a composite abrasive body comprising the steps of:
    (a) placing within an enclosure of protective metal a sintered carbide body, a smaller mass of cubic boron nitride crystals and material for providing an alloy of aluminum and an element selected from the group consisting of nickel, cobalt, manganese, iron, vanadium and chromium, the quantity of aluminum being in the range of from about 1 to about 40% by weight of the weight of cubic boron nitride, the quantity of the alloying metal being in the range of from about 2 to about 100% by weight of the weight of cubic boron nitride and the carbide portion of said sintered carbide body being predominately of a material selected from the group consisting of tungsten carbide, titanium carbide, tantalum carbide and mixtures thereof,
    (b) simultaneously heating said enclosure and the contents thereof to temperatures in the range of 1300–1600° C. and applying pressures thereto in excess of about 40 kilobars for at least 3 minutes,
    (c) ceasing the input of heat to said enclosure,
    (d) removing the pressure applied to said enclosure and
    (e) recovering the composite abrasive body produced.

7. The process of claim 6 wherein the cubic boron nitride crystals are disposed in a layer over at least one surface of the sintered carbide body, said layer being about 0.060 inch or less in thickness.

8. The process of claim 6 wherein the sintered carbide body contains tungsten carbide and cobalt.

9. The process of claim 6 wherein the material for providing an alloy of aluminum is in the form of discs including a disc of aluminum.

10. The process of claim 6 wherein the material for providing an alloy of aluminum is in the form of a powder.

11. The process of preparing a composite abrasive body comprising the steps of:

(a) placing within an enclosure of protective metal a quantity of sinterable carbide powder, a separate quantity of cubic boron nitride crystals and material for providing an alloy of aluminum and an element selected from the group consisting of nickel, cobalt, manganese, iron, vanadium and chromium, the quantity of aluminum being in the range of from about 1 to about 40% by weight of the weight of cubic boron nitride, the quantity of the alloying metal being in the range of from about 2 to about 100% by weight of the weight of cubic boron nitride and the carbide portion of said quantity of sinterable carbide powder being predominately of a material selected from the group consisting of tungsten carbide, titanium carbide, tantalum carbide, and mixtures thereof, (b) simultaneously heating said enclosure and the contents thereof to temperatures in the range of 1300–1600° C. and applying pressures thereto in excess of about 40 kilobars for at least 3 minutes, (c) ceasing the input of heat to said enclosure, (d) removing the pressure applied to said enclosure and (e) recovering the composite abrasive body produced.

12. The process of claim 11 wherein the cubic boron nitride crystals are disclosed in a layer over at least one flat surface of the quantity of carbide powder, said layer being about 0.060 inch or less in thickness.

13. The process of claim 11 wherein the sinterable carbide powder contains tungsten carbide powder and cobalt powder.

14. The process of claim 11 wherein the material for providing an alloy of aluminum is in powder form.

15. The process of claim 14 wherein powdered material is mixed with the cubic boron nitride crystals.

16. The process of claim 11 wherein the material for providing an alloy of aluminum is in the form of discs including a disc of aluminum.

17. A compact abrasive body on a sintered metal carbide substrate, said body consisting of a mass of cubic boron nitride crystals and a metallic phase, the size of the individual cubic boron nitride crystals being less than about 30 micrometers in largest dimension and said metallic phase containing aluminum atoms and atoms of at least one alloying element selected from the group consisting of nickel, cobalt, manganese, iron, vanadium and chromium, the total of said atoms of aluminum and alloying element being in excess of 1% by weight of cubic boron nitride.

References Cited
UNITED STATES PATENTS

| | | | |
|---|---|---|---|
| 3,233,988 | 2/1966 | Wentorf et al. | 51—309 |
| 2,888,355 | 5/1959 | Taylor | 51—307 |
| 3,136,615 | 6/1964 | Bovenkerk et al. | 51—309 |
| 3,192,015 | 6/1965 | Wentorf | 51—307 |
| 3,212,851 | 10/1965 | Bundy et al. | 51—307 |
| 2,947,617 | 8/1960 | Wentorf | 51—307 |

DONALD J. ARNOLD, Primary Examiner

U.S. Cl. X.R.

51—308, 309